United States Patent
Ko et al.

(10) Patent No.: US 11,541,327 B2
(45) Date of Patent: Jan. 3, 2023

(54) METHOD OF SEPARATING ORGANIC SOLVENT FROM MIXED SOLUTION CONTAINING THE ORGANIC SOLVENT

(71) Applicant: LG Chem, Ltd., Seoul (KR)

(72) Inventors: Jun Seok Ko, Daejeon (KR); Hoi In Jeong, Daejeon (KR); Jeong Seok Lee, Daejeon (KR); Dong Min Kim, Daejeon (KR); Su Ji Yoon, Daejeon (KR)

(73) Assignee: LG Chem, Ltd.

( * ) Notice: Subject to any disclaimer, the term of this patent is extended or adjusted under 35 U.S.C. 154(b) by 127 days.

(21) Appl. No.: 16/980,035

(22) PCT Filed: Oct. 29, 2019

(86) PCT No.: PCT/KR2019/014390
§ 371 (c)(1),
(2) Date: Sep. 11, 2020

(87) PCT Pub. No.: WO2020/091391
PCT Pub. Date: May 7, 2020

(65) Prior Publication Data
US 2021/0016200 A1 Jan. 21, 2021

(30) Foreign Application Priority Data
Nov. 1, 2018 (KR) .................. 10-2018-0133010

(51) Int. Cl.
*B01D 3/14* (2006.01)
*B01D 3/16* (2006.01)
(Continued)

(52) U.S. Cl.
CPC .............. *B01D 3/143* (2013.01); *B01D 3/16* (2013.01); *B01D 3/32* (2013.01); *B01D 3/4211* (2013.01);
(Continued)

(58) Field of Classification Search
CPC . B01D 3/143; B01D 3/16; B01D 3/32; B01D 3/4211; C08F 6/04; C08F 236/10; C08J 11/02
See application file for complete search history.

(56) References Cited

U.S. PATENT DOCUMENTS 4,408,039 A 10/1983 Irvin
6,576,721 B2* 6/2003 Kobayashi ................ C07C 2/30
585/512

(Continued)

FOREIGN PATENT DOCUMENTS

CN 1406217 A 3/2003
CN 1908040 A 2/2007
(Continued)

OTHER PUBLICATIONS

Extended European Search Report including Written Opinion for Application No. 19878701.2 dated Feb. 11, 2021, 10 pages.
(Continued)

*Primary Examiner* — Jonathan Miller
(74) *Attorney, Agent, or Firm* — Lerner, David, Littenberg, Krumholz & Mentlik, LLP

(57) ABSTRACT

A method of separating an organic solvent which may easily separate and recover an organic solvent from a mixed solution containing the organic solvent, and an organic solvent separation system capable of performing the same are disclosed herein. In some embodiments, the method includes introducing a first mixed solution into a first distillation column to recover an organic solvent and discharge a first fraction containing an unrecovered organic solvent and a high boiling point compound A to a bottom of the column, introducing a second mixed solution into a second distillation column to recover organic solvent and discharge a second fraction containing an unrecovered organic solvent and a high boiling point compound B, and
(Continued)

introducing the first fraction and the second fraction into a third distillation column to recover an organic solvent-rich fraction and a high boiling point compound-rich fraction.

15 Claims, 2 Drawing Sheets

(51) Int. Cl.
  *B01D 3/32* (2006.01)
  *B01D 3/42* (2006.01)
  *C08F 6/04* (2006.01)
  *C08J 11/02* (2006.01)
  *C08F 236/10* (2006.01)

(52) U.S. Cl.
  CPC ............. *C08F 6/04* (2013.01); *C08J 11/02* (2013.01); *C08F 236/10* (2013.01)

(56) References Cited

U.S. PATENT DOCUMENTS

| | | | | |
|---|---|---|---|---|
| 6,616,831 | B1* | 9/2003 | Gentry | C10G 21/00 208/321 |
| 10,632,446 | B2 | 4/2020 | Uhm et al. | |
| 10,703,875 | B2* | 7/2020 | Lee | B01D 3/009 |
| 10,968,152 | B2* | 4/2021 | Heida | C07C 7/08 |
| 11,027,255 | B2 | 6/2021 | Uhm et al. | |
| 11,097,996 | B2* | 8/2021 | Kim | C07C 2/08 |
| 2003/0027947 | A1 | 2/2003 | Kobayashi | C07C 2/30 526/70 |
| 2011/0230624 | A1 | 9/2011 | Kloppenburg et al. | |
| 2014/0275422 | A1 | 9/2014 | Ueba et al. | |
| 2014/0296589 | A1 | 10/2014 | Krupa | |
| 2016/0199754 | A1* | 7/2016 | Donaldson | B01D 15/38 585/825 |
| 2016/0325263 | A1 | 11/2016 | Uhm et al. | |
| 2018/0319949 | A1* | 11/2018 | Lee | B01D 3/007 |
| 2019/0389984 | A1* | 12/2019 | Jeong | C08F 4/52 |
| 2020/0010387 | A1* | 1/2020 | Heida | B01D 3/143 |
| 2020/0070121 | A1 | 3/2020 | Uhm et al. | |
| 2021/0230085 | A1* | 7/2021 | Kim | C07C 7/04 |

FOREIGN PATENT DOCUMENTS

| | | |
|---|---|---|
| CN | 101121633 A | 2/2008 |
| CN | 103121908 A | 5/2013 |
| CN | 103958549 A | 7/2014 |
| CN | 105246864 A | 1/2016 |
| CN | 105949500 A | 9/2016 |
| CN | 107488269 A | 12/2017 |
| CN | 108368288 A | 8/2018 |
| CN | 207822550 U | 9/2018 |
| JP | S58122002 A | 7/1983 |
| JP | 2001131103 A | 5/2001 |
| JP | 2001300206 A | 10/2001 |
| JP | 2010536945 A | 12/2010 |
| JP | 2014224070 A | 12/2014 |
| JP | 5994726 B2 | 9/2016 |
| KR | 20030018474 A | 3/2003 |
| KR | 100831513 B1 | 5/2008 |
| KR | 20150135488 A | 12/2015 |
| KR | 20160052533 A | 5/2016 |
| KR | 20170050004 A | 5/2017 |
| KR | 20170141872 A | 12/2017 |
| KR | 101834609 B1 | 4/2018 |
| KR | 20180079701 A | 7/2018 |
| RU | 2646425 C2 | 3/2018 |
| WO | 2017217708 A1 | 12/2017 |

OTHER PUBLICATIONS

International Search Report for PCT/KR2019/014390 dated Feb. 11, 2020; 2 pages.
Chinese Search Report for CN Application No. 201980018878.9 dated Jul. 29, 2021, 4 pgs.
Taiwanese Search Report for Application No. 108139204, dated Apr. 8, 2021, 1 page . . . .

* cited by examiner

METHOD OF SEPARATING ORGANIC SOLVENT FROM MIXED SOLUTION CONTAINING THE ORGANIC SOLVENT

CROSS-REFERENCE TO RELATED APPLICATIONS

The present application is a national phase entry under 35 U.S.C. § 371 of International Application No. PCT/KR2019/014390, filed on Oct. 29, 2019, which claims priority from Korean Patent Application No. 10-2018-0133010, filed on Nov. 1, 2018, the disclosures of which are incorporated by reference herein.

TECHNICAL FIELD

The present invention relates to a method of separating an organic solvent which may easily separate and recover an organic solvent from a mixed solution containing the organic solvent, and an organic solvent separation system capable of performing the same.

BACKGROUND ART

In line with the recent demand for fuel-efficient cars, a conjugated diene-based polymer having adjustment stability represented by wet road surface resistance as well as low rolling resistance and excellent abrasion resistance and tensile properties is required as a rubber material for a tire.

In order to reduce the rolling resistance of a tire, there is a method of reducing a hysteresis loss of a vulcanized rubber, and rebound resilience at 50° C. to 80° C., tan δ, or Goodrich heat generation is used as an evaluation index of the vulcanized rubber. That is, it is desirable to use a rubber material having high rebound resilience at the above temperature or low tan δ or Goodrich heat generation.

A natural rubber, a polyisoprene rubber, or a polybutadiene rubber is known as a rubber material having a low hysteresis loss, but these rubbers may have low wet road surface resistance. Thus, recently, a conjugated diene-based polymer or copolymer, such as a styrene-butadiene rubber (hereinafter, referred to as "SBR") or a butadiene rubber (hereinafter, referred to as "BR"), is prepared by emulsion polymerization or solution polymerization to be used as a rubber for a tire. Among these polymerizations, the greatest advantage of the solution polymerization in comparison to the emulsion polymerization is that a vinyl structure content and a styrene content, which specify physical properties of the rubber, may be arbitrarily adjusted and its molecular weight and physical properties may be controlled by coupling or modification. Thus, the SBR and BR prepared by the solution polymerization are widely used as a rubber material for a tire because it is easy to change a structure of the finally prepared SBR or BR, and movement of chain ends may be reduced and a coupling force with a filler, such as silica or carbon black, may be increased by coupling or modification of the chain ends.

When the conjugated diene-based polymer or copolymer is prepared by solution polymerization, methods, such as steam stripping and distillation, are used to recover and reuse an unreacted monomer and an organic solvent after a polymerization reaction.

The steam stripping is a process of forming rubber particles by contacting a polymer solution obtained after the polymerization reaction with steam and separating a volatile substance containing an organic solvent except the rubber particles, wherein the separated volatile substance includes a dimer and a trimer of a monomer and an additive, such as a polar additive used in the polymerization reaction, in addition to an unreacted monomer and the organic solvent, and, in order to increase economic efficiency and polymerization stability in preparation processes of the SBR and BR, the unreacted monomer and the organic solvent in the volatile substance are recovered and reused and a remaining high boiling point material including the dimer and trimer of the monomer and the additive must be separated and removed.

Thus, the high boiling point material is usually separated and removed from the volatile substance and the organic solvent is separated and recovered by using a distillation column, but there is a limitation in that a large amount of the organic solvent is contained and removed when the high boiling point material is removed.

Particularly, with respect to the SBR preparation process, an unreacted aromatic vinyl-based monomer is discharged together with other high boiling point material and organic solvent from a bottom of the distillation column, and, thus, in a case in which an amount of the organic solvent discharged is controlled to be 1.5 times or less an amount of the high boiling point material by increasing a temperature of the bottom of the column to 100° C. or more in order to reduce the amount of the organic solvent discharged to the bottom of the column, since a ratio of the unreacted aromatic vinyl-based monomer at the bottom of the column is increased to cause polymerization between these monomers, a plugging phenomenon of a reboiler and a transfer pipe occurs, and, as a result, a shutdown of the entire SBR preparation process is inevitable and productivity may be reduced.

Therefore, in order to secure economic efficiency and stability of the SBR preparation process, there is a need to develop a method capable of easily separating and recovering an organic solvent from a waste solution, as a volatile substance generated after the steam stripping in the preparation process.

PRIOR ART DOCUMENT

Patent Document (Patent Document 1) KR10-2017-0141872 A

DISCLOSURE OF THE INVENTION

Technical Problem

The present invention provides a method of separating an organic solvent which may easily separate and recover an organic solvent from a mixed solution containing the organic solvent, for example, a waste solution generated from a steam stripping process in a preparation process of a solution-polymerized styrene-butadiene copolymer.

The present invention also provides an organic solvent separation system capable of performing the above-described method of separating an organic solvent.

Technical Solution

According to an aspect of the present invention, there is provided a method of separating an organic solvent which includes the steps of: independently performing a process of introducing a first mixed solution containing an organic solvent and high boiling point compound A into a first distillation column to recover the organic solvent from a top of the column and discharge a first fraction containing an unrecovered organic solvent and the high boiling point compound A to a bottom of the column (step 1-1); and a process of introducing a second mixed solution containing an organic solvent and high boiling point compound B into a second distillation column to recover the organic solvent from a top of the column and discharge a second fraction containing an unrecovered organic solvent and the high boiling point compound B to a bottom of the column (step 1-2) (step 1); and 2) introducing the first fraction and the second fraction into a third distillation column to recover an organic solvent-rich fraction from a top of the column and a high boiling point compound-rich fraction containing the high boiling point compound A and the high boiling point compound B from a bottom of the column (step 2), wherein the high boiling point compound-rich fraction includes an unreacted aromatic vinyl-based monomer in an amount of less than 30 wt %, the first mixed solution is a waste solution remaining after a polymer has been removed by a steam stripping process that is part of a solution-polymerized styrene-butadiene copolymer preparation process, and the second mixed solution is a waste solution remaining after a polymer has been removed by a steam stripping process that is part of a rare earth metal catalyzed butadiene polymer preparation process.

According to another aspect of the present invention, there is provided a separation system including: a first distillation column which includes a first supply line configured to supply a first mixed solution containing an organic solvent and high boiling point compound A on one side thereof, a first organic solvent recovery line configured to recover the organic solvent at a top of the column, and a first discharge line configured to discharge a first fraction containing an unrecovered organic solvent and the high boiling point compound A at a bottom of the column; a second distillation column which includes a second supply line configured to supply a second mixed solution containing an organic solvent and high boiling point compound B on one side thereof, a second organic solvent recovery line configured to recover the organic solvent at a top of the column, and a second discharge line configured to discharge a second fraction containing an unrecovered organic solvent and the high boiling point compound B at a bottom of the column; and a third distillation column which includes a third supply line connected to the first discharge line and the second discharge line and configured to supply the first fraction and the second fraction on one side thereof, an overhead recovery line configured to recover an organic solvent-rich fraction at a top of the column, and a bottom recovery line configured to recover a high boiling point compound-rich fraction containing the high boiling point compound A and the high boiling point compound B at a bottom of the column.

Advantageous Effects

With respect to a separation method according to the present invention, in separating and recovering an organic solvent from a mixed solution containing the organic solvent, for example, a waste solution generated from a steam stripping process in a solution-polymerized styrene-butadiene copolymer preparation process, a ratio of an aromatic vinyl-based monomer in the mixed solution may be reduced by separating the organic solvent by mixing a waste solution generated from a steam stripping process in a preparation process of a rare earth metal catalyzed butadiene polymer without containing an unreacted aromatic vinyl-based monomer, the ratio of the aromatic vinyl-based monomer may thus be maintained at less than 30 wt % even if a ratio of the organic solvent in a high boiling point compound-rich fraction discharged is reduced, and, as a result, an organic solvent loss rate may be significantly reduced without a plugging phenomenon of a reboiler and a transfer pipe.

Also, since the separation method according to the present invention may suppress polymerization between the aromatic vinyl-based monomers in the high boiling point compound-rich fraction present at a bottom of a column by adjusting bottom temperature and pressure of the third distillation column to specific conditions and may suppress a rapid increase in the ratio of the aromatic vinyl-based monomer, the plugging phenomenon of the reboiler and transfer pipe may be suppressed, and thus, the separation method may be easily performed.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
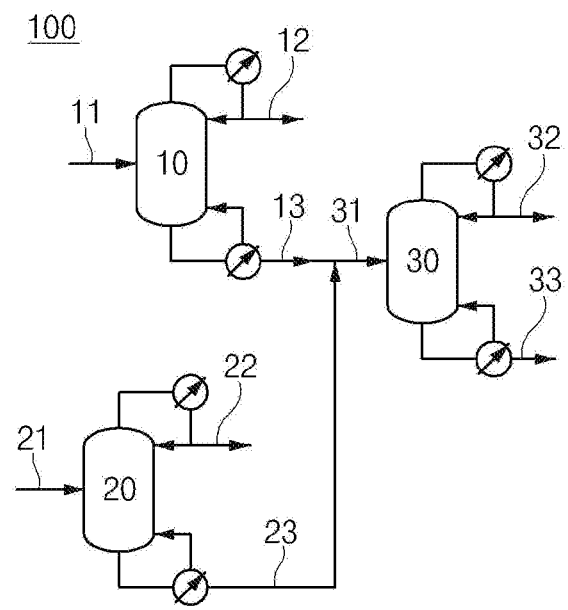
FIG. 1 schematically illustrates a separation system for separating and recovering an organic solvent from a mixed solution containing the organic solvent according to an embodiment of the present invention.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Terms and measurement method used in the present invention may be defined as follows unless otherwise defined.

Terms

The term "fraction" used in the present invention is to distinguish a substance, wherein, for example, with respect to a first fraction and a second fraction, components constituting each fraction are different.

The term "rich fraction" used in the present invention denotes a fraction containing a specific component at a higher ratio than other components in the fraction composed of several components or a mixture, wherein, for example, an organic solvent-rich fraction denotes a faction containing an organic solvent at a higher ratio than other components among components constituting the fraction.

The term "organic solvent" used in the present invention may be at least one selected from the group consisting of n-pentane, n-hexane, and cyclohexane. Specifically, the organic solvent may be n-hexane.

The terms "step 1-1" and "step 1-2" used in the present invention are process steps constituting step 1, wherein the step 1-1 and the step 1-2 may be performed simultaneously and independently to each other, or may be performed independently of each other but may be performed sequentially.

The term "bar" used in the present invention denotes a gauge pressure, and 1 bar may be equal to 0.987 atm.

[Measurement Method]

In the present invention, the expression "organic solvent loss rate (%)" represents a ratio of an amount of organic solvent included in a high boiling point compound-rich fraction and discharged to an amount of organic solvent included in a mixed solution in which a first mixed solution and a second mixed solution are combined, wherein it may be a value calculated through Equation 1 below.

Organic solvent loss rate (%)=[amount of organic solvent in high boiling point compound-rich fraction (kg)/amount of organic solvent in mixed solution(kg)]×100       [Equation 1]

The present invention provides a method of separating an organic solvent which may easily separate and recover an organic solvent from a mixed solution containing the organic solvent, for example, a waste solution generated from a steam stripping process in a solution-polymerized styrene-butadiene copolymer preparation process.

Also, the preparation method of the present invention may easily separate and recover an organic solvent from a waste solution generated from a steam stripping process in a preparation process of a rare earth metal catalyzed butadiene polymer at the same time while separating and recovering the organic solvent from the waste solution generated from the steam stripping process in the solution-polymerized styrene-butadiene copolymer preparation process.

The method of separating an organic solvent according to an embodiment of the present invention includes the steps of: independently performing a process of introducing a first mixed solution containing an organic solvent and high boiling point compound A into a first distillation column to recover the organic solvent from a top of the column and discharge a first fraction containing an unrecovered organic solvent and the high boiling point compound A to a bottom of the column (step 1-1); and a process of introducing a second mixed solution containing an organic solvent and high boiling point compound B into a second distillation column to recover the organic solvent from a top of the column and discharge a second fraction containing an unrecovered organic solvent and the high boiling point compound B to a bottom of the column (step 1-2) (step 1); and 2) introducing the first fraction and the second fraction into a third distillation column to recover an organic solvent-rich fraction from a top of the column and a high boiling point compound-rich fraction containing the high boiling point compound A and the high boiling point compound B from a bottom of the column (step 2), wherein the high boiling point compound-rich fraction includes an unreacted aromatic vinyl-based monomer in an amount of less than 30 wt %. The first mixed solution is a waste solution remaining after a polymer has been removed by the steam stripping process that is part of the solution-polymerized styrene-butadiene copolymer preparation process, and the second mixed solution is a waste solution remaining after a polymer has been removed by the steam stripping process that is part of the rare earth metal catalyzed butadiene polymer preparation process.

The step 1 is a step for separating the first fraction containing the high boiling point compound A and the second fraction containing the high boiling point compound B respectively from the first mixed solution and the second mixed solution, wherein it may be composed of step 1-1 of discharging the first fraction from the first mixed solution and step 1-2 of discharging the second fraction from the second mixed solution, and the step 1-1 and the step 1-2 may be performed independently from each other.

Hereinafter, the step 1-1 and the step 1-2 will be described separately in detail.

Step 1-1

The step 1-1 is a process of recovering an organic solvent and discharging a first fraction containing an unrecovered organic solvent and the high boiling point compound A from a first mixed solution containing the organic solvent and high boiling point compound A, wherein it may be performed by introducing the first mixed solution into a first distillation column to recover the organic solvent from a top of the column and discharging the first fraction containing the unrecovered organic solvent and the high boiling point compound A to a bottom of the column.

In the present invention, the first mixed solution may be a waste solution (residual solution) remaining after a polymer has been removed by the steam stripping process that is part of the solution-polymerized styrene-butadiene copolymer preparation process as described above, and may include the organic solvent in an amount of 95 wt % or more.

Specifically, a polymer solution is prepared by polymerizing an aromatic vinyl-based monomer and a conjugated diene-based monomer in the presence of an organic solvent using a polymerization initiator and an additive such as a polar additive, and the solution-polymerized styrene-butadiene copolymer is prepared by separating rubber particles, which are formed by steam stripping the polymer solution, and a volatile substance containing the organic solvent excluding the rubber particles, wherein the volatile substance obtained after the steam stripping may be the first mixed solution. Also, a substance having a lower boiling point than the organic solvent may be further removed from the volatile substance obtained after the steam stripping through the distillation column, and, in this case, the first mixed solution may be a volatile substance in a state in which the substance having a lower boiling point than the organic solvent has been further removed from the volatile substance obtained after the steam stripping.

That is, the first mixed solution may include an organic solvent, a conjugated diene-based monomer, a dimer and a trimer of the conjugated diene-based monomer, an aromatic vinyl-based monomer, and a dimer and a trimer of the aromatic vinyl-based monomer, and, in some cases, may further include a polar additive.

The step 1-1 may be performed through distillation using the first distillation column, and, accordingly, the relatively low boiling point substance and the high boiling point substance may be separated to be recovered and discharged from the top of the first distillation column and to the bottom of the first distillation column, respectively.

That is, the organic solvent and the conjugated diene-based monomer may be recovered from the top of the first distillation column, and the organic solvent and conjugated diene-based monomer thus recovered may be reused in a polymerization reaction.

Also, the unrecovered organic solvent and the high boiling point compound may be discharged to the bottom of the first distillation column, wherein the high boiling point compound may include an unreacted aromatic vinyl-based monomer, a dimer and a trimer of a conjugated diene-based monomer, and a dimer and a trimer of an aromatic vinyl-based monomer, and, in some cases, may further include a polar additive.

In this case, the conjugated diene-based monomer may include at least one selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (halo means a halogen atom), and may specifically be 1,3-butadiene.

Furthermore, the aromatic vinyl-based monomer may include at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, 1-vinyl-5-hexylnaphthalene, 3-(2-pyrrolidino ethyl)styrene, 4-(2-pyrrolidino ethyl) styrene, and 3-(2-pyrrolidino-1-methyl ethyl)styrene, and may specifically be styrene.

Also, the polymerization initiator may include at least one selected from the group consisting of methyllithium, ethyllithium, propyllithium, n-butyllithium, s-butyllithium, hexyllithium, n-decyllithium, t-octyllithium, phenyllithium, 1-naphthyllithium, n-eicosyllithium and 4-butylphenyllithium, 4-tolyllithium, cyclohexyl lithium, 3,5-di-n-heptylcyclohexyl lithium, 4-cyclopentyllithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide, and may specifically be n-butyllithium.

Furthermore, the polar additive may include at least one selected from the group consisting of tetrahydrofuran, ditetrahydrofurylpropane, diethylether, cycloamylether, dipropyl ether, ethylene dimethyl ether, diethyl glycol, dimethyl ether, tertiary butoxyethoxyethane, bis(3-dimethylaminoethyl) ether, (dimethylaminoethyl)ethylether, trimethylamine, triethylamine, tripropylamine, and tetramethylethylenediamine.

Step 1-2

The step 1-2 is a process of recovering an organic solvent and discharging a second fraction containing an unrecovered organic solvent and the high boiling point compound B from a second mixed solution containing the organic solvent and high boiling point compound B, wherein it may be performed by introducing the second mixed solution into a second distillation column to recover the organic solvent from a top of the column and discharge the second fraction containing the unrecovered organic solvent and the high boiling point compound B to a bottom of the column.

In the present invention, the second mixed solution may be a waste solution (residual solution) remaining after a polymer has been removed by the steam stripping process that is part of the rare earth metal catalyzed butadiene polymer preparation process as described above, and may include the organic solvent in an amount of 95 wt % or more.

Specifically, a polymer solution is prepared by polymerizing a conjugated diene-based monomer in the presence of a rare earth metal-containing catalyst composition in the organic solvent, and the rare earth metal catalyzed butadiene polymer is prepared by separating rubber particles, which are formed by steam stripping the polymer solution, and a volatile substance containing the organic solvent excluding the rubber particles, wherein the volatile substance obtained after the steam stripping may be the second mixed solution. The second mixed solution may include an organic solvent, a conjugated diene-based monomer, and a dimer and a trimer of the conjugated diene-based monomer.

The step 1-2 may be performed through distillation using the second distillation column, and, accordingly, the relatively low boiling point substance and the high boiling point substance may be separated to be recovered and discharged from the top of the second distillation column and to the bottom of the second distillation column, respectively.

That is, the organic solvent and the conjugated diene-based monomer may be recovered from the top of the second distillation column, and the organic solvent and conjugated diene-based monomer thus recovered may be reused in a polymerization reaction.

Also, the unrecovered organic solvent and the high boiling point compound may be discharged to the bottom of the second distillation column, wherein the high boiling point compound may include a dimer and a trimer of a conjugated diene-based monomer.

In this case, the conjugated diene-based monomer may be the same as that described above.

Furthermore, in the present invention, the rare earth metal-containing catalyst composition includes a rare earth metal-containing compound, and may further include at least one of an alkylating agent, a halide, and a conjugated diene-based monomer.

Specifically, the rare earth metal-containing compound may include at least one compound of rare earth metals with an atomic number of 57 to 71, such as lanthanum, neodymium, cerium, gadolinium, or praseodymium, may include carboxylates containing the above-described rare earth metal (e.g., neodymium acetate, neodymium acrylate, neodymium methacrylate, neodymium gluconate, neodymium citrate, neodymium fumarate, neodymium lactate, neodymium maleate, neodymium oxalate, neodymium 2-ethylhexanoate, or neodymium neodecanoate); organophosphates containing the above-described rare earth metal (e.g., neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, or neodymium didecyl phosphate); organophosphonates containing the above-described rare earth metal (e.g., neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, or neodymium octadecyl phosphonate); organophosphinates containing the above-described rare earth metal (e.g., neodymium butylphosphinate, neodymium pentylphosphinate, neodymium hexylphosphinate, neodymium heptylphosphinate, neodymium octylphosphinate, neodymium (1-methylheptyl)phosphinate, or neodymium (2-ethylhexyl)phosphinate); carbamates containing the above-described rare earth metal (e.g., neodymium dimethylcarbamate, neodymium diethylcarbamate, neodymium diisopropylcarbamate, neodymium dibutylcarbamate, or neodymium dibenzylcarbamate); dithiocarbamates containing the above-described rare earth metal (e.g., neodymium dimethyldithiocarbamate, neodymium diethyldithiocarbamate, neodymium diisopropyldithiocarbamate, or neodymium dibutyldithiocarbamate); xanthates containing the above-described rare earth metal (e.g., neodymium methylxanthate, neodymium ethylxanthate, neodymium isopropylxanthate, neodymium butylxanthate, or neodymium benzylxanthate); β-diketonates containing the above-described rare earth metal (e.g., neodymium acetylacetonate, neodymium trifluoroacetylacetonate, neodymium hexafluoroacetylacetonate, or neodymium benzoylacetonate); alkoxides or aryloxides containing the above-described rare earth metal (e.g., neodymium methoxide, neodymium ethoxide, neodymium isopropoxide, neodymium phenoxide, or neodymium nonylphenoxide); halides or pseudo-halides containing the above-described rare earth metal (e.g., neodymium fluoride, neodymium chloride, neodymium bromide, neodymium iodide, neodymium cyanide, neodymium cyanate, neodymium thiocyanate, or neodymium azide); oxyhalides containing the above-described rare earth metal (e.g., neodymium oxyfluoride, neodymium oxychloride, or neodymium oxybromide); or organolanthanide rare earth element-containing compounds including at least one rare earth element-carbon bond (e.g., $Cp_3Ln$, $Cp_2LnR$, $Cp_2LnCl$, $CpLnCl_2$, $CpLn$ (cyclooctatetraene), $(C_5Me_5)_2LnR$, $LnR_3$, $Ln(allyl)_3$, or $Ln(allyl)_2Cl$, where Ln represents a rare earth metal element, and R represents a hydrocarbyl group), and may include any one thereof or a mixture of two or more thereof.

Specifically, the rare earth metal-containing compound may include at least one selected from the group consisting of $Nd(2\text{-ethylhexanoate})_3$, $Nd(2,2\text{-dimethyl decanoate})_3$, $Nd(2,2\text{-diethyl decanoate})_3$, $Nd(2,2\text{-dipropyl decanoate})_3$, $Nd(2,2\text{-dibutyl decanoate})_3$, $Nd(2,2\text{-dihexyl decanoate})_3$, $Nd(2,2\text{-dioctyl decanoate})_3$, $Nd(2\text{-ethyl-2-propyl decanoate})_3$, $Nd(2\text{-ethyl-2-butyl decanoate})_3$, $Nd(2\text{-ethyl-2-hexyl decanoate})_3$, $Nd(2\text{-propyl-2-butyl decanoate})_3$, $Nd(2\text{-propyl-2-hexyl decanoate})_3$, $Nd(2\text{-propyl-2 isopropyl decanoate})_3$, $Nd(2\text{-butyl-2-hexyl decanoate})_3$, $Nd(2\text{-hexyl-2-octyl decanoate})_3$, $Nd(2\text{-t-butyl decanoate})_3$, $Nd(2,2\text{-diethyl octanoate})_3$, $Nd(2,2\text{-dipropyl octanoate})_3$, $Nd(2,2\text{-dibutyl octanoate})_3$, $Nd(2,2\text{-dihexyl octanoate})_3$, $Nd(2\text{-ethyl 2 propyl octanoate})_3$, $Nd(2\text{-ethyl-2-hexyl octanoate})_3$, $Nd(2,2\text{-diethyl nonanoate})_3$, $Nd(2,2\text{-dipropyl nonanoate})_3$, $Nd(2,2\text{-dibutyl nonanoate})_3$, $Nd(2,2\text{-dihexyl nonanoate})_3$, $Nd(2\text{-ethyl-2-propyl nonanoate})$, and $Nd(2\text{-ethyl-2-hexyl nonanoate})_3$.

The alkylating agent may be used without particular limitation as long as it is commonly used as an alkylating agent during the preparation of a butadiene-based polymer, and, for example, may be an organometallic compound, which is soluble in the polymerization solvent and contains a metal-carbon bond, such as an organoaluminum compound, an organomagnesium compound, or an organolithium compound.

Specifically, the organoaluminum compound may include aluminoxane such as methylaluminoxane (MAO), modified methylaluminoxane (MAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, or 2,6-dimethylphenylaluminoxane; alkylaluminum such as trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, or trioctylaluminum; dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, or benzyl-n-octylaluminum hydride; and hydrocarbylaluminum dihydride such as ethylaluminum dihydride, n-propylaluminum dihydride, isopropylaluminum dihydride, n-butylaluminum dihydride, isobutylaluminum dihydride, or n-octylaluminum dihydride.

The organomagnesium compound may include an alkyl magnesium compound such as diethylmagnesium, di-n-propylmagnesium, diisopropylmagnesium, dibutylmagnesium, dihexylmagnesium, diphenylmagnesium, or dibenzylmagnesium, and the organolithium compound may include an alkyl lithium compound such as n-butyllithium.

The halide is not particularly limited, but, for example, may include elemental halogen, an interhalogen compound, halogenated hydrogen, an organic halide, a non-metal halide, a metal halide, or an organic metal halide.

The elemental halogen may include fluorine, chlorine, bromine, or iodine.

Also, the interhalogen compound may include iodine monochloride, iodine monobromide, iodine trichloride, iodine pentafluoride, iodine monofluoride, or iodine trifluoride.

Furthermore, the halogenated hydrogen may include hydrogen fluoride, hydrogen chloride, hydrogen bromide, or hydrogen iodide.

Also, the organic halide may include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzyliene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as 'iodoform'), tetraiodomethane, 1-iodopropane, 2-iodopropane, 1,3-diiodopropane, t-butyl iodide, 2,2-dimethyl-1-iodopropane (also referred to as 'neopentyl iodide'), allyl iodide, iodobenzene, benzyl iodide, diphenylmethyl iodide, triphenylmethyl iodide, benzylidene iodide (also referred to as 'benzal iodide'), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, or methyl iodoformate.

Furthermore, the non-metal halide may include phosphorous trichloride, phosphorous tribromide, phosphorous pentachloride, phosphorous oxychloride, phosphorous oxybromide, boron trifluoride, boron trichloride, boron tribromide, silicon tetrafluoride, silicon tetrachloride ($SiCl_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphorous triiodide, phosphorous oxyiodide, or selenium tetraiodide.

Also, the metal halide may include tin tetrachloride, tin tetrabromide, aluminum trichloride, aluminum tribromide, antimony trichloride, antimony pentachloride, antimony tribromide, aluminum trifluoride, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide, or magnesium diiodide.

Furthermore, the organic metal halide may include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, or di-t-butyl tin diiodide.

Also, the conjugated diene-based monomer included in the catalyst composition may be the same as that described above.

The step 2 is a step for separating an organic solvent-rich fraction and a high boiling point compound-rich fraction from the first fraction and the second fraction, wherein the step 2 may be performed by introducing the first fraction and the second fraction into a third distillation column to recover the organic solvent-rich fraction from a top of the column and the high boiling point compound-rich fraction from a bottom of the column, and the high boiling point compound-rich fraction may contain the high boiling point compound A and the high boiling point compound B.

The first fraction and the second fraction may be mixed before being introduced into the third distillation column.

During the performing of the step 2, a bottom temperature and a pressure of the third distillation column may be adjusted to be less than 100° C. and less than 0.4 bar, respectively, and may specifically be adjusted to be in a range of 70° C. or more to less than 100° C. and in a range of 0.05 bar or more to less than 0.4 bar, respectively. More specifically, the bottom temperature of the third distillation column may be in a range of 90° C. or more to less than 100° C. and the pressure may be in a range of 0.15 bar or more to less than 0.4 bar, for example, the temperature may be in a range of 95° C. or more to less than 100° C. and the pressure may be in a range of 0.15 bar or more to less than 0.35 bar.

Also, the high boiling point compound-rich fraction may include an unreacted aromatic vinyl-based monomer in an amount of 30 wt % or less. Herein, an amount ratio of the unreacted aromatic vinyl-based monomer in the high boiling point compound-rich fraction represents a composition ratio of the aromatic vinyl-based monomer at the bottom of the third distillation column, wherein it may be controlled by adjusting the bottom temperature and pressure of the third distillation column as described above.

Specifically, an amount of the organic solvent-rich fraction separated and recovered from the high boiling point compound-rich fraction is controlled according to the bottom temperature and pressure of the third distillation column, a ratio of the organic solvent in the high boiling point compound-rich fraction may be affected accordingly, and, as a result, the ratio of the unreacted aromatic vinyl-based monomer in the high boiling point compound-rich fraction may be changed. For example, if the amount of the organic solvent-rich fraction recovered is increased, the ratio of the organic solvent in the high boiling point compound-rich fraction will be relatively reduced, a ratio of other components constituting the high boiling point compound-rich fraction will thus be increased as much as the ratio of the organic solvent in the high boiling point compound-rich fraction has been reduced, and, accordingly, the ratio of the unreacted aromatic vinyl-based monomer will be increased.

If, in a case in which the temperature of the bottom of the third distillation column is 100° C. or more or the amount of the unreacted aromatic vinyl-based monomer in the high boiling point compound-rich fraction is greater than 30 wt %, polymerization between the unreacted aromatic vinyl-based monomers may be performed, and, thus, a problem of plugging a reboiler and a transfer pipe, which are connected to the bottom of the third distillation column, may occur.

That is, since the separation method according to the embodiment of the present invention may suppress the occurrence of the polymerization between the unreacted aromatic vinyl-based monomers in the high boiling point compound-rich fraction by adjusting conditions of the bottom of the third distillation column as described above and, furthermore, may adjust the ratio of the unreacted aromatic vinyl-based monomer in the high boiling point compound-rich fraction to be less than a predetermined ratio to also suppress the occurrence of the polymerization between the unreacted aromatic vinyl-based monomers due to an increase in the ratio of the unreacted aromatic vinyl-based monomer, a plugging phenomenon of the reboiler and transfer pipe, which are connected to the bottom of the third distillation column, may be suppressed, and, as a result, it may be economically favorable because process interruption due to the plugging phenomenon may be prevented.

Also, since the separation method according to the embodiment of the present invention may reduce the ratio of the unreacted aromatic vinyl-based monomer, apart from the ratio of the organic solvent in the third distillation column, by separating the organic solvent-rich fraction and the high boiling point compound-rich fraction through the introduction of the first fraction and the second fraction together into the same third distillation column, an increasing trend in the ratio of the unreacted aromatic vinyl-based monomer due to the reduction in the ratio of the organic solvent in the high boiling point compound-rich fraction may be slow and the separation method may thus be free from problems caused by the increase in the ratio of the unreacted aromatic vinyl-based monomer in the high boiling point compound-rich fraction, and therefore, more organic solvent may be recovered and a loss rate of the organic solvent included in the high boiling point compound-rich fraction and discharged may be reduced.

The organic solvent-rich fraction may include the organic solvent in an amount of 90 wt % or more, particularly 95 wt % or more, and more particularly 100 wt %. That is, the organic solvent-rich fraction separated and recovered from the mixed solution by the separation method according to the present invention may be mostly composed of the organic solvent. The organic solvent thus recovered may be reused in the polymerization reaction.

Furthermore, the high boiling point compound-rich fraction contains the high boiling point compound A and the high boiling point compound B as main components, but may contain a portion of the organic solvent.

With respect to a high boiling point compound-rich fraction discharged by separating a waste solution that is discharged from a steam stripping process in a conventional solution-polymerized styrene-butadiene copolymer preparation process, since the process was designed so that the high boiling point compound-rich fraction included an organic solvent in a high ratio of 60 wt % or more in order to prevent a plugging phenomenon of a reboiler and a transfer pipe, an organic solvent loss rate was high. However, the separation method according to the embodiment of the present invention may maintain the ratio of the aromatic vinyl-based monomer at less than 30 wt %, even if the ratio of the organic solvent in the high boiling point compound-rich fraction is reduced, by mixing the second mixed solution, as the waste solution discharged from the steam stripping process in the rare earth metal catalyzed butadiene polymer preparation process, with the first mixed solution, as the waste solution discharged from the steam stripping process in the solution-polymerized styrene-butadiene copolymer preparation process, and separating them from each other, and thus, the separation method according to the present invention may be more free from problems caused by the reboiler and transfer pipe plugging phenomenon.

Thus, the high boiling point compound-rich fraction obtained by the separation method according to the embodiment of the present invention may contain the organic solvent in an amount of 40 wt % or less, and the organic solvent in the high boiling point compound-rich fraction may be included in a ratio of less than 1.0 part by weight, particularly less than 0.7 part by weight, and more particularly 0.67 part by weight or less to 1.0 part by weight of the high boiling point compound in the high boiling point compound-rich fraction.

As a result, the separation method according to the embodiment of the present invention may significantly reduce the ratio of the organic solvent in the discharged high boiling point compound-rich fraction without the plugging phenomenon of the reboiler and transfer pipe which are connected to the bottom of the third distillation column.

Specifically, the separation method may have an organic solvent loss rate of less than 0.05%.

Herein, the organic solvent loss rate represents a ratio of the amount of the organic solvent included in the high boiling point compound-rich fraction and discharged to the amount of the organic solvent included in the mixed solution in which the first mixed solution and the second mixed solution are combined, wherein it may be a value calculated through Equation 1 below.

Organic solvent loss rate (%)=[amount of organic solvent in high boiling point compound-rich fraction (kg)/amount of organic solvent in mixed solution(kg)]×100  [Equation 1]

Also, a recovery rate of the organic solvent separated and recovered through the separation method according to the embodiment of the present invention may be 99.95% or more.

Herein, the recovery rate of the organic solvent represents a ratio of a total amount of the recovered organic solvent to the amount of the organic solvent included in the mixed solution in which the first mixed solution and the second mixed solution are combined, wherein it may be a value calculated through Equation 2 below.

Organic solvent recovery rate (%)=[total amount of organic solvent recovered(kg)/amount of organic solvent in mixed solution (kg)]×100  [Equation 2]

The method of separating an organic solvent according to the embodiment of the present invention may be performed using a separation system to be described later.

The present invention provides an organic solvent separation system capable of recovering and discharging by finally separating the organic solvent-rich fraction and the high boiling point compound-rich fraction from the first mixed solution and the second mixed solution.

The separation system according to an embodiment of the present invention includes: a first distillation column which includes a first supply line configured to supply a first mixed solution containing an organic solvent and high boiling point compound A on one side thereof, a first organic solvent recovery line configured to recover the organic solvent at a top of the column, and a first discharge line configured to discharge a first fraction containing an unrecovered organic solvent and the high boiling point compound A at a bottom of the column; a second distillation column which includes a second supply line configured to supply a second mixed solution containing an organic solvent and high boiling point compound B on one side thereof, a second organic solvent recovery line configured to recover the organic solvent at a top of the column, and a second discharge line configured to discharge a second fraction containing an unrecovered organic solvent and the high boiling point compound B at a bottom of the column; and a third distillation column which includes a third supply line connected to the first discharge line and the second discharge line and configured to supply the first fraction and the second fraction on one side thereof, an overhead recovery line configured to recover an organic solvent-rich fraction at a top of the column, and a bottom recovery line configured to recover a high boiling point compound-rich fraction containing the high boiling point compound A and the high boiling point compound B at a bottom of the column, wherein a bottom temperature and a pressure of the third distillation column may be less than 100° C. and less than 0.4 bar, respectively.

Hereinafter, the separation system will be described in detail with reference to FIG. 1.

FIG. 1 schematically illustrates the organic solvent separation system capable of recovering and discharging by finally separating the organic solvent-rich fraction and the high boiling point compound-rich fraction from the first mixed solution and the second mixed solution according to the embodiment of the present invention.

As illustrated in FIG. 1, a separation system 100 according to the embodiment of the present invention includes a first distillation column 10, a second distillation column 20, and a third distillation column 30, wherein each distillation column may include a reboiler at a bottom of the column and a condenser at a top of the column.

The first distillation column 10 performs a process of recovering an organic solvent and discharging a first fraction containing an unrecovered organic solvent and the high boiling point compound A from a first mixed solution containing the organic solvent and high boiling point compound A, wherein the first distillation column 10 may include a first supply line 11 configured to supply the first mixed solution on one side thereof, a first organic solvent recovery line 12 configured to recover the organic solvent at a top of the column, and a first discharge line 13 configured to discharge a first fraction at a bottom of the column.

The second distillation column 20 performs a process of recovering an organic solvent and discharging a second fraction containing an unrecovered organic solvent and the high boiling point compound B from a second mixed solution containing the organic solvent and high boiling point compound B, wherein the second distillation column 20 may include a second supply line 21 configured to supply the second mixed solution on one side thereof, a second organic solvent recovery line 22 configured to recover the organic solvent at a top of the column, and a second discharge line 23 configured to discharge a second fraction at a bottom of the column.

Also, the third distillation column 30 separates and recovers an organic solvent-rich fraction and a high boiling point compound-rich fraction containing the high boiling point compound A and the high boiling point compound B from the first fraction and the second fraction, wherein the third distillation column 30 may include a third supply line 31 configured to supply the first fraction and the second fraction on one side thereof, an overhead recovery line 32 configured to recover an organic solvent-rich fraction at a top of the column, and a bottom recovery line 33 configured to recover a high boiling point compound-rich fraction at a bottom of the column, wherein the third supply line 31 may be connected to the first discharge line 13 and the second discharge line 23. That is, the first distillation column 10 may be connected to the third distillation column 30 by the first discharge line 13, the second distillation column 20 may be connected to the third distillation column 30 by the second discharge line 23, and the first discharge line 13 and the second discharge line 23 each may be connected to the third supply line 31 in a separate line, or the second discharge line 23 may be connected to the third supply line 31 through the first discharge line 13.

Hereinafter, the present invention will be described in more detail, according to specific examples. However, the following examples are merely presented to describe the present invention in more detail, and the scope of the present invention is not limited thereto.

In the following examples and comparative examples, the separation method according to the present invention was simulated by using ASPEN PLUS, a commercial process simulation program. Program's built-in values and values described in the literature were used as constants required for the simulation.

In this case, the first mixed solution was set to include 1,3-butadiene, styrene, n-hexane, tetramethylethylenediamine (TMEDA), ethylbenzene, a dimer and a trimer of 1,3-butadiene or styrene, and 4-t-butylcatechol (TBC), and the second mixed solution was set to include 1,3-butadiene, n-hexane, butol, a dimer and a trimer of 1,3-butadiene, and 4-t-butylcatechol. In this case, components in the first mixed solution correspond to components of the waste solution obtained after the steam stripping process in the solution-polymerized styrene-butadiene copolymer preparation process, and components in the second mixed solution correspond to components of the waste solution obtained after the steam stripping process in the preparation process of the rare earth metal catalyzed butadiene polymer.

Example 1

A process of separating an organic solvent from a mixed solution containing the above-described first mixed solution and second mixed solution was performed using the separation system 100 as illustrated in FIG. 1.

Specifically, the first mixed solution was supplied to the first distillation column 10 through the first supply line 11 to recover n-hexane by the first organic solvent recovery line 12 at the top of the column and discharge a first fraction containing unrecovered n-hexane and high boiling point compound A by the first discharge line 13 at the bottom of the column. In this case, 1,3-butadiene as well as the n-hexane was recovered through the first organic solvent recovery line 12, and the high boiling point compound A included styrene, tetramethylethylenediamine (TMEDA), ethylbenzene, a dimer and a trimer of 1,3-butadiene or styrene, and 4-t-butylcatechol (TBC).

Also, separately, the second mixed solution was supplied to the second distillation column 20 through the second supply line 21 to recover n-hexane by the second organic solvent recovery line 22 at the top of the column and discharge a second fraction containing unrecovered n-hexane and high boiling point compound B by the second discharge line 23 at the bottom of the column. In this case, 1,3-butadiene as well as the n-hexane was recovered through the second organic solvent recovery line 22, and the high boiling point compound B included butol, a dimer and a trimer of 1,3-butadiene, and 4-t-butylcatechol (TBC).

Thereafter, the first fraction and the second fraction were supplied to the third distillation column 30 through the third supply line 31 to recover n-hexane by the overhead recovery line 32 and recover a high boiling point compound-rich fraction containing the high boiling point compound A and the high boiling point compound B by the bottom recovery line 33.

In this case, the first mixed solution was set to be supplied to the first distillation column 10 at a total flow of 73,000 kg/hr (1,3-butadiene 21.8 kg/h, styrene 51.0 kg/hr, n-hexane 72896.2 kg/hr, ethylbenzene 9.1 kg/hr, tetramethylethylenediamine 3.6 kg/hr, dimer of the 1,3-butadiene or styrene 10.9 kg/hr, trimer of the 1,3-butadiene or styrene 5.5 kg/hr, and 4-t-butylcatechol 1.8 kg/hr) and at bar and 55° C., the second mixed solution was set to be supplied to the second distillation column 20 at a total flow of 65,000 kg/hr (1,3-butadiene 19.5 kg/h, n-hexane 64948.0 kg/hr, butol 16.3 kg/hr, dimer of the 1,3-butadiene 7.8 kg/hr, trimer of the 1,3-butadiene 5.2 kg/hr, and 4-t-butylcatechol 3.3 kg/hr) and at 4 bar and 55° C., and process conditions of the first distillation column 10, the second distillation column 20, and the third distillation column 30 were set at temperatures and pressures as illustrated in Table 1 below. Finally, a recovery rate of the organic solvent was 99.95%.

TABLE 1

| Category | First distillation column | | Second distillation column | | Third distillation column | |
| --- | --- | --- | --- | --- | --- | --- |
| | Top | Bottom | Top | Bottom | Top | Bottom |
| Temperature (° C.) | 85 | 95 | 85 | 102 | 72 | 98 |
| Pressure (bar) | 0.6 | 0.8 | 0.6 | 0.8 | 0.15 | 0.3 |
| Discharge amount (recovery amount, kg/hr) | 72637.9 | 362.1 | 64926.6 | 73.4 | 265.9 | 169.6 |
| n-hexane amount (kg/hr) | 72606.5 | 289.7 | 64903.9 | 44.1 | 265.9 | 67.9 |
| High boiling point compound amount (kg/hr) | 9.5 | 72.4 | 3.2 | 29.4 | 0 | 101.8 |
| Styrene amount ratio(wt %) | 0.0098 | 12.9 | 0 | 0 | 0 | 27.6 |
| Amount ratio (weight ratio) of organic solvent | | | 0.67 | | | |

In Table 1, the high boiling point compound includes styrene, ethylbenzene, tetramethylethylenediamine, a dimer and a trimer of 1,3-butadiene or styrene, 4-t-butylcatechol, and butol, the amount ratio of the organic solvent denotes an amount ratio of the organic solvent to the high boiling point compound in the high boiling point compound-rich fraction finally discharged, and a total n-hexane loss rate (%) is a value calculated by Equation 1 described above, wherein it is specifically as follows.

Total n-hexane loss rate (%)=[(67.9)/(72896.2+64948)]×100

Example 2

Example 2 was performed in the same manner as in Example 1 except that the temperature and the pressure in the third distillation column were set as shown in the following Table 2.

TABLE 2

| Category | First distillation column | | Second distillation column | | Third distillation column | |
| --- | --- | --- | --- | --- | --- | --- |
| | Top | Bottom | Top | Bottom | Top | Bottom |
| Temperature (° C.) | 85 | 95 | 85 | 102 | 70.9 | 99.8 |
| Pressure (bar) | 0.6 | 0.8 | 0.6 | 0.8 | 0.1 | 0.2 |
| Discharge amount (recovery amount, kg/hr) | 72637.9 | 362.1 | 64926.6 | 73.4 | 276 | 159.5 |
| n-hexane amount (kg/hr) | 72606.5 | 289.7 | 64903.9 | 44.1 | 276 | 57.8 |
| High boiling point compound amount (kg/hr) | 9.5 | 72.4 | 3.2 | 29.4 | 0 | 101.8 |
| Styrene amount ratio(wt %) | 0.0098 | 12.9 | 0 | 0 | 0 | 29.3 |
| Amount ratio (weight ratio) of organic solvent | | | 0.57 | | | |
| Total n-hexane loss rate (%) | | | 0.042 | | | |

In Table 2, the high boiling point compound includes styrene, ethylbenzene, tetramethylethylenediamine, a dimer and a trimer of 1,3-butadiene or styrene, 4-t-butylcatechol, and butol, the amount ratio of the organic solvent denotes an amount ratio of the organic solvent to the high boiling point compound in the high boiling point compound-rich fraction finally discharged, and a total n-hexane loss rate (%) is a value calculated by Equation 1 described above, wherein it is specifically as follows.

Total n-hexane loss rate (%)=[(57.8)/(72896.2+64948)]×100

Example 3

Example 3 was performed in the same manner as in Example 1 except that the temperature and the pressure in the third distillation column were set as shown in the following Table 3.

TABLE 3

| Category | First distillation column | | Second distillation column | | Third distillation column | |
|---|---|---|---|---|---|---|
| | Top | Bottom | Top | Bottom | Top | Bottom |
| Temperature (° C.) | 85 | 95 | 85 | 102 | 74.9 | 99.2 |
| Pressure (bar) | 0.6 | 0.8 | 0.6 | 0.8 | 0.05 | 0.15 |
| Discharge amount (recovery amount, kg/hr) | 72637.9 | 362.1 | 64926.6 | 73.4 | 273.9 | 161.6 |
| n-hexane amount (kg/hr) | 72606.5 | 289.7 | 64903.9 | 44.1 | 273.9 | 59.8 |
| High boiling point compound amount (kg/hr) | 9.5 | 72.4 | 3.2 | 29.4 | 0 | 101.8 |
| Styrene amount ratio(wt %) | 0.0098 | 12.9 | 0 | 0 | 0 | 28.9 |
| Amount ratio (weight ratio) of organic solvent | | | 0.59 | | | |
| Total n-hexane loss rate (%) | | | 0.043 | | | |

In Table 3, the high boiling point compound includes styrene, ethylbenzene, tetramethylethylenediamine, a dimer and a trimer of 1,3-butadiene or styrene, 4-t-butylcatechol, and butol, the amount ratio of the organic solvent denotes an amount ratio of the organic solvent to the high boiling point compound in the high boiling point compound-rich fraction finally discharged, and a total n-hexane loss rate (%) is a value calculated by Equation 1 described above, wherein it is specifically as follows.

Total n-hexane loss rate (%)=[(59.8)/(72896.2+ 64948)]×100

Comparative Example 1

Figure 2:
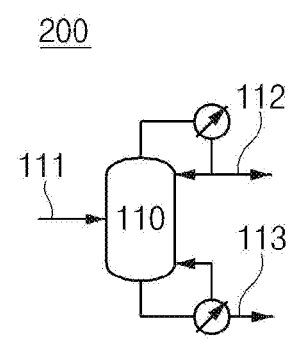
FIG. 2 schematically illustrates a separation system for separating and recovering an organic solvent from a mixed solution containing the organic solvent according to Comparative Example 1 of the present invention.

A process of separating an organic solvent from the above-described first mixed solution was performed using a separation system 200 as illustrated in FIG. 2.

Specifically, the first mixed solution was supplied to a first distillation column 110 through a first supply line 111 to recover n-hexane by an overhead recovery line 112 and discharge a first fraction containing unrecovered n-hexane and high boiling point compound A by a bottom recovery line 113. In this case, 1,3-butadiene as well as the n-hexane was recovered through the overhead recovery line 112, and the high boiling point compound A included styrene, tetramethylethylenediamine (TMEDA), ethylbenzene, a dimer and a trimer of 1,3-butadiene or styrene, and 4-t-butylcatechol (TBC).

In this case, the first mixed solution was set to be supplied to the first distillation column 110 at a total flow of 73,000 kg/hr (1,3-butadiene 21.8 kg/h, styrene 51.0 kg/hr, n-hexane 72896.2 kg/hr, ethylbenzene 9.1 kg/hr, tetramethylethylenediamine 3.6 kg/hr, dimer of the 1,3-butadiene or styrene 10.9 kg/hr, trimer of the 1,3-butadiene or styrene 5.5 kg/hr, and 4-t-butylcatechol 1.8 kg/hr) and at bar and 55° C., and process conditions of the first distillation column 110 were set at temperatures and pressures as illustrated in Table 4 below.

TABLE 4

| | First distillation column | |
|---|---|---|
| Category | Top | Bottom |
| Temperature (° C.) | 85 | 95 |
| Pressure (bar) | 0.6 | 0.8 |
| Discharge amount (recovery amount, kg/hr) | 72637.9 | 362.1 |
| n-hexane amount (kg/hr) | 72606.5 | 289.7 |
| High boiling point compound amount (kg/hr) | 9.5 | 72.4 |
| Styrene amount ratio(wt %) | 0.0098 | 12.9 |
| Amount ratio (weight ratio) of organic solvent | 4.00 | |
| Total n-hexane loss rate (%) | 0.397 | |

In Table 4, the high boiling point compound includes styrene, ethylbenzene, tetramethylethylenediamine, a dimer and a trimer of 1,3-butadiene or styrene, and 4-t-butylcatechol, the amount ratio of the organic solvent denotes an amount ratio of the organic solvent to the high boiling point compound in the high boiling point compound-rich fraction finally discharged, and a total n-hexane loss rate (%) is a value calculated by Equation 1 described above, wherein it is specifically as follows.

Total n-hexane loss rate (%)=[(289.7)/(72896.2)]× 100

Comparative Example 2

Figure 3:
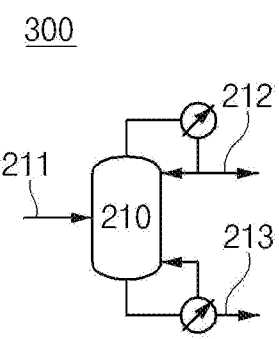
FIG. 3 schematically illustrates a separation system for separating and recovering an organic solvent from a mixed solution containing the organic solvent according to Comparative Example 2 of the present invention.

A process of separating an organic solvent from the above-described second mixed solution was performed using a separation system 300 as illustrated in FIG. 3.

Specifically, the second mixed solution was supplied to a second distillation column 210 through a second supply line 211 to recover n-hexane by an overhead recovery line 212 and discharge a second fraction containing unrecovered n-hexane and high boiling point compound B by a bottom recovery line 213. In this case, 1,3-butadiene as well as the n-hexane was recovered through the overhead recovery line 212, and the high boiling point compound B included butol, a dimer and a trimer of 1,3-butadiene, and 4-t-butylcatechol (TBC).

In this case, the second mixed solution was set to be supplied to the second distillation column 210 at a total flow of 65,000 kg/hr (1,3-butadiene 19.5 kg/h, n-hexane 64948.0 kg/hr, butol 16.3 kg/hr, dimer of the 1,3-butadiene 7.8 kg/hr, trimer of the 1,3-butadiene 5.2 kg/hr, and 4-t-butylcatechol 3.3 kg/hr) and at 4 bar and 55° C., and process conditions of the second distillation column 210 were set at temperatures and pressures as illustrated in Table 5 below.

TABLE 5

| Category | Second distillation column | |
|---|---|---|
| | Top | Bottom |
| Temperature (° C.) | 85 | 102 |
| Pressure (bar) | 0.6 | 0.8 |
| Discharge amount (recovery amount, kg/hr) | 64926.6 | 73.4 |
| n-hexane amount (kg/hr) | 64903.9 | 44.1 |
| High boiling point compound amount (kg/hr) | 3.2 | 29.4 |
| Styrene amount ratio(wt %) | 0 | 0 |
| Amount ratio (weight ratio) of organic solvent | 1.5 | |
| Total n-hexane loss rate (%) | 0.068 | |

In Table 5, the high boiling point compound includes a dimer and a trimer of 1,3-butadiene, 4-t-butylcatechol, and butol, the amount ratio of the organic solvent denotes an amount ratio of the organic solvent to the high boiling point compound in the high boiling point compound-rich fraction finally discharged, and a total n-hexane loss rate (%) is a value calculated by Equation 1 described above, wherein it is specifically as follows.

Total n-hexane loss rate (%)=[(44.1)/(64948)]×100

Comparative Example 3

Figure 4:
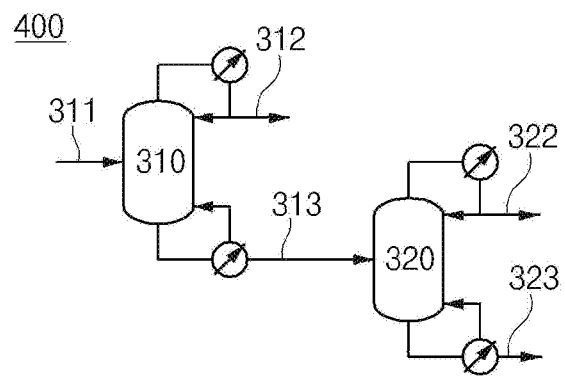
FIG. 4 schematically illustrates a separation system for separating and recovering an organic solvent from a mixed solution containing the organic solvent according to Comparative Example 3 of the present invention.

A process of separating an organic solvent from the above-described first mixed solution was performed using a separation system 400 as illustrated in FIG. 4.

Specifically, the first mixed solution was supplied to a distillation column 310 through a supply line 311 to recover n-hexane by an organic solvent recovery line 312 at a top of the column and discharge a fraction containing unrecovered n-hexane and high boiling point compound A-1 by a discharge line 313 at a bottom of the column. In this case, 1,3-butadiene as well as the n-hexane was recovered through the organic solvent recovery line 312, and the high boiling point compound A-1 included styrene, tetramethylethylenediamine (TMEDA), ethylbenzene, a dimer and a trimer of 1,3-butadiene or styrene, and 4-t-butylcatechol (TBC).

Thereafter, the fraction was supplied to a distillation column 1-2 320 through a supply line 321 to recover n-hexane by an overhead recovery line 322 and recover a high boiling point compound-rich fraction by a bottom recovery line 323.

In this case, the first mixed solution was set to be supplied to the distillation column 310 at a total flow of 73,000 kg/hr (1,3-butadiene 21.8 kg/h, styrene 51.0 kg/hr, n-hexane 72896.2 kg/hr, ethylbenzene 9.1 kg/hr, tetramethylethylenediamine 3.6 kg/hr, dimer of the 1,3-butadiene or styrene 10.9 kg/hr, trimer of the 1,3-butadiene or styrene 5.5 kg/hr, and 4-t-butylcatechol 1.8 kg/hr) and at 4 bar and 55° C., and process conditions of the distillation column 310 and the distillation column 320 were set at temperatures and pressures as illustrated in Table 6 below.

TABLE 6

| Category | Distillation column 310 | | Distillation column 320 | |
|---|---|---|---|---|
| | Top | Bottom | Top | Bottom |
| Temperature (° C.) | 85 | 95 | 72 | 98 |
| Pressure (bar) | 0.6 | 0.8 | 0.15 | 0.3 |
| Discharge amount (recovery amount, kg/hr) | 72637.9 | 362.1 | 188.8 | 173.3 |
| n-hexane amount (kg/hr) | 72606.5 | 289.7 | 188.8 | 100.9 |
| High boiling point compound amount (kg/hr) | 9.5 | 72.4 | 0 | 72.4 |
| Styrene amount ratio(wt %) | 0.0098 | 12.9 | 0 | 27.6 |
| Amount ratio (weight ratio) of organic solvent | | 1.39 | | |
| Total n-hexane loss rate (%) | | 0.138 | | |

In Table 6, the high boiling point compound includes styrene, ethylbenzene, tetramethylethylenediamine, a dimer and a trimer of 1,3-butadiene or styrene, and 4-t-butylcatechol, the amount ratio of the organic solvent denotes an amount ratio of the organic solvent to the high boiling point compound in the high boiling point compound-rich fraction finally discharged, and a total n-hexane loss rate (%) is a value calculated by Equation 1 described above, wherein it is specifically as follows.

Total n-hexane loss rate (%)=[(100.9)/(72896.2)]×100

Comparative Example 4

Comparative Example 4 was performed in the same manner as in Comparative Example 3 except that the top and bottom temperatures of the distillation column were set as shown in the following Table 7. However, since a reboiler and a transfer pipe, which were connected to the bottom of the distillation column 1-2, were clogged after 5 days of repeated operation, the operation was stopped, and the reboiler and transfer pipe, which had been clogged for 5 days, were washed.

TABLE 7

| Category | Distillation column 310 | | Distillation column 320 | |
|---|---|---|---|---|
| | Top | Bottom | Top | Bottom |
| Temperature (° C.) | 85 | 95 | 85 | 110 |
| Pressure (bar) | 0.6 | 0.8 | 0.6 | 0.9 |
| Discharge amount (recovery amount, kg/hr) | 72637.9 | 362.1 | 241.4 | 120.7 |
| n-hexane amount (kg/hr) | 72606.5 | 289.7 | 241.4 | 48.3 |
| High boiling point compound amount (kg/hr) | 9.5 | 72.4 | 0 | 72.4 |
| Styrene amount ratio(wt %) | 0.0098 | 12.9 | 0 | 38.8 |
| Amount ratio (weight ratio) of organic solvent | | 0.67 | | |
| Total n-hexane loss rate (%) | | 0.066 | | |

In Table 7, the high boiling point compound includes styrene, ethylbenzene, tetramethylethylenediamine, a dimer and a trimer of 1,3-butadiene or styrene, and 4-t-butylcatechol, the amount ratio of the organic solvent denotes an amount ratio of the organic solvent to the high boiling point compound in the high boiling point compound-rich fraction finally discharged, and a total n-hexane loss rate (%) is a value calculated by Equation 1 described above, wherein it is specifically as follows.

Total n-hexane loss rate (%)=[(48.3)/(72896.2)]×100

From Tables 1 to 7, it was confirmed that the organic solvent loss rates of the separation methods of Examples 1 to 3 according to the embodiment of the present invention were significantly reduced in comparison to those of the separation methods of Comparative Examples 1 to 4 without the plugging phenomenon of the reboiler and the transfer pipe.

Specifically, it was confirmed that the organic solvent loss rates of Examples 1 to 3 were significantly reduced to a level of 11% to 72% of those of Comparative Examples 1 to 4.

Also, with respect to Examples 1 to 3, the styrene ratios were maintained at less than 30 wt % even if the ratio of the organic solvent in the high boiling point compound-rich fraction was significantly reduced in comparison to Comparative Examples 1 to 3, that is, the amount of the organic solvent in the finally discharged high boiling point compound-rich fraction was 1.0 part by weight relative to 1 part by weight of the high boiling point compound, and thus, the organic solvent was easily separated with a significantly reduced organic solvent loss rate without the plugging phenomenon of the reboiler and the transfer pipe.

In the high boiling point compound-rich fraction containing the aromatic vinyl monomer which was discharged to the bottom of the distillation column, polymerization between the monomers may occur when a total amount of the aromatic vinyl monomer was 30 wt % or more, polymerization may occur by a reaction between the monomers when the temperature of the bottom of the distillation column was 100° C. or more even if the total amount of the aromatic vinyl monomer in the high boiling point compound-rich fraction was less than 30 wt %, the plugging phenomenon of the reboiler and the transfer pipe, which were connected to the bottom of the distillation column, may occur accordingly, and, as a result, the process may be stopped to cause extensive losses when applied to industry.

Therefore, in order to be easily applied to the industry, the loss rate of the organic solvent must be minimized without the plugging phenomenon of the reboiler and the transfer pipe as in the separation method according to the embodiment of the present invention.

Specifically, with respect to Comparative Example 4, the amount of the organic solvent in the high boiling point compound-rich fraction was reduced to 0.67 part by weight relative to 1 part by weight of the high boiling point compound by increasing the amount of the organic solvent separated from the top of the column by increasing the temperature of the distillation column 1-2, but the ratio of the styrene in the high boiling point compound-rich fraction was greater than 30 wt %, and thus, a plugging phenomenon of the reboiler and the transfer pipe, which were connected to the bottom of the distillation column 1-2, occurred. In addition, with respect to Comparative Example 4, the organic solvent loss rate was significantly increased to a level of 135% of that of Example 1 despite the fact that operating conditions of the distillation column 1-2 were adjusted to difficult conditions, that is, a high temperature in comparison to that of Example 1.

DESCRIPTION OF THE SYMBOLS

100, 200, 300, 400: Separation system
10, 110: First distillation column
20, 210: Second distillation column
30: Third distillation column
310: Distillation column
320: Distillation column
11, 111: First supply line
12: First organic solvent recovery line
13: First discharge line
21, 211: Second supply line
22: Second organic solvent recovery line
23: Second discharge line
31: Third supply line
32, 112, 212, 322: Overhead recovery line
33, 113, 213, 323: Bottom recovery line
311: Supply line
312: Organic solvent recovery line
313: Discharge line
321: Supply line

The invention claimed is:

1. A method of separating an organic solvent, the method comprising:
   (1-1) introducing a first mixed solution containing an organic solvent and high boiling point compound A into a first distillation column to recover the organic solvent from a top of the column and discharge a first fraction containing an unrecovered organic solvent and the high boiling point compound A to a bottom of the column;
   (1-2) introducing a second mixed solution containing an organic solvent and high boiling point compound B into a second distillation column to recover the organic solvent from a top of the column and discharge a second fraction containing an unrecovered organic solvent and the high boiling point compound B to a bottom of the column, wherein steps (1-1) and (1-2) are performed independently of each other; and
   (2) introducing the first fraction and the second fraction into a third distillation column to recover an organic solvent-rich fraction from a top of the column and a high boiling point compound-rich fraction containing the high boiling point compound A and the high boiling point compound B from a bottom of the column,
   wherein the first mixed solution is a waste solution remaining after a polymer has been removed by a steam stripping process that is part of a solution-polymerized styrene-butadiene copolymer preparation process, and the second mixed solution is a waste solution remaining after a polymer has been removed by a steam stripping process that is part of a rare earth metal catalyzed butadiene polymer preparation process.

2. The method of claim 1, wherein the organic solvent of the first mixed solution is present in an amount of 95 wt % or more.

3. The method of claim 1, wherein the organic solvent of the second mixed solution is present in an amount of 95 wt % or more.

4. The method of claim 1, wherein the high boiling point compound-rich fraction comprises an unreacted aromatic vinyl-based monomer in an amount of less than 30 wt %.

5. The method of claim 1, wherein the step (2) is performed under a condition in which a bottom temperature and a pressure of the third distillation column are less than 100° C. and less than 0.4 bar, respectively.

6. The method of claim 1, wherein the step (2) is performed under a condition in which a bottom temperature and a pressure of the third distillation column are in a range of 70° C. or more to less than 100° C. and in a range of 0.05 bar or more to less than 0.4 bar, respectively.

7. The method of claim 1, wherein the high boiling point compound A comprises an unreacted aromatic vinyl-based monomer, a dimer of a conjugated diene-based monomer, a trimer of the conjugated diene-based monomer, a dimer of an aromatic vinyl-based monomer, a trimer of the aromatic vinyl-based monomer, and a polar additive.

8. The method of claim 1, wherein the high boiling point compound B comprises a dimer of a conjugated diene-based monomer and a trimer of the conjugated diene-based monomer.

9. The method of claim 1, wherein the first fraction and the second fraction are mixed before being introduced into the third distillation column.

10. The method of claim 1, wherein the high boiling point compound-rich fraction comprises the organic solvent in an amount of 40 wt % or less.

11. The method of claim 1, wherein the organic solvent in the high boiling point compound-rich fraction is included in a ratio of less than 1.0 part by weight to 1 part by weight of the high boiling point compound in the high boiling point compound-rich fraction.

12. The method of claim 1, wherein an organic solvent loss rate of the method is less than 0.05%.

13. An organic solvent separation system comprising:
a first distillation column which includes a first supply line configured to supply a first mixed solution containing an organic solvent and high boiling point compound A on one side thereof, a first organic solvent recovery line configured to recover the organic solvent at a top of the column, and a first discharge line configured to discharge a first fraction containing an unrecovered organic solvent and the high boiling point compound A at a bottom of the column;
a second distillation column which includes a second supply line, which is independent of the first supply line, and configured to separately supply a second mixed solution containing an organic solvent and high boiling point compound B on one side thereof, wherein the second mixed solution is different from the first mixed solution, a second organic solvent recovery line configured to recover the organic solvent at a top of the column, and a second discharge line configured to discharge a second fraction containing an unrecovered organic solvent and the high boiling point compound B at a bottom of the column; and
a third distillation column which includes a third supply line directly connected to the first discharge line and the second discharge line and configured to supply the first fraction and the second fraction on one side thereof, an overhead recovery line configured to recover an organic solvent-rich fraction at a top of the column, and a bottom recovery line configured to recover a high boiling point compound-rich fraction containing the high boiling point compound A and the high boiling point compound B at a bottom of the column.

14. The organic solvent separation system of claim 13, wherein the second discharge line is connected to the third supply line to through the first discharge line.

15. The organic solvent separation system of claim 13, wherein a bottom temperature and a pressure of the third distillation column are less than 100° C. and less than 0.4 bar, respectively.

* * * * *